United States Patent
Kamel

(10) Patent No.: US 6,212,262 B1
(45) Date of Patent: Apr. 3, 2001

(54) METHOD OF PERFORMING AUTOMATIC SALES TRANSACTIONS IN AN ADVERTISER-SPONSORED TELEPHONY SYSTEM

(75) Inventor: Alexandre Perry Kamel, Annapolis, MD (US)

(73) Assignee: BroadPoint Communications, Inc., Landover, MD (US)

( * ) Notice: Subject to any disclaimer, the term of this patent is extended or adjusted under 35 U.S.C. 154(b) by 0 days.

(21) Appl. No.: 09/267,403

(22) Filed: Mar. 15, 1999

(51) Int. Cl.[7] ........................................ H04M 1/64
(52) U.S. Cl. ........................... 379/88.22; 379/93.12
(58) Field of Search ................ 379/67.1, 88.01, 379/88.19, 88.22, 88.23, 88.24, 91.01, 93.02, 93.03, 93.12

(56) References Cited

U.S. PATENT DOCUMENTS

| | | | |
|---|---|---|---|
| 4,850,007 | * | 7/1989 | Marino et al. ................. 379/67.1 |
| 5,333,186 | * | 7/1994 | Gupta ............................ 379/201 |
| 5,448,625 | * | 9/1995 | Lederman ..................... 379/67.1 |
| 5,539,809 | * | 7/1996 | Mayer et al. ................. 379/67.1 |
| 5,608,785 | * | 3/1997 | Kasday .......................... 379/201 |
| 5,652,784 | * | 7/1997 | Blen et al. .................... 379/67.1 |
| 5,729,693 | * | 3/1998 | Holda-Fleck ............... 379/93.12 |
| 5,970,124 | * | 10/1999 | Csaszar et al. ............. 379/88.18 |

* cited by examiner

Primary Examiner—Scott L. Weaver
(74) Attorney, Agent, or Firm—Jones Volentine, LLC

(57) ABSTRACT

An advertiser-sponsored telephony system includes an automatic sales transaction option, whereby a telephony user may automatically purchase an advertised product without disconnecting from the advertiser-sponsored telephony system. After hearing a promotional message for an advertised product in the advertiser-sponsored telephony system, a telephony user is presented with an option to submit an instruction to automatically place a purchase order for the product. The advertiser-sponsored telephony system verifies the telephony user's identity and confirms that an account which has been pre-registered by the telephony user has sufficient funds to cover the price of the purchase order. If these criteria are satisfied, then the purchase order is processed and the caller continues with his or her telephone call.

9 Claims, 1 Drawing Sheet

METHOD OF PERFORMING AUTOMATIC SALES TRANSACTIONS IN AN ADVERTISER-SPONSORED TELEPHONY SYSTEM

BACKGROUND OF THE INVENTION

1) Field of the Invention

This invention pertains to the field of advertiser-sponsored telephony systems, and more particularly to a method of performing an automatic sales transaction in an advertiser-sponsored telephony system.

2) Description of the Related Art

Historically, a variety of advertising vehicles have existed for communicating information regarding goods or services (collectively referred to hereinafter as "products") which are for sale by a producer or retailer to potential buyers. Magazines, newspapers, billboards, direct mail solicitations, radio, and television all may effectively advertise the availability of products for sale. However, none of these vehicles allow an advertisement recipient to become a buyer "on the spot" by automatically purchasing or ordering an advertised product. The potential buyer must either visit a retail establishment which sells the advertised product, or, perhaps, the buyer can place a telephone call to a producer or retailer to place an order, or order by mail.

In the intervening time period between being exposed to the advertisement and having an opportunity to order the product, the potential buyer may forget information regarding the advertised product and a sale may be lost. Disadvantageously, the delay between the advertisement and the opportunity to order the product may have a tendency to reduce "impulse buying." Therefore, producers and retailers desire a method of performing an automatic sales transaction whereby an advertising recipient who is a potential buyer may automatically place an immediate purchase order for an advertised product. Desirably, an automatic sales transaction requires a minimal amount of input or work by the potential buyer to place the purchase order. Also desirably, the automatic sales transaction is accomplished by a computer or other automated device receiving and storing the purchase order without the need to have a person take the purchase order information at the time of the automatic sales transaction.

With the proliferation of computers connected "on-line" to on-line services and the Internet, the computer has become a popular product advertisement vehicle. A potential buyer's computer connected to an on-line service provider host computer or Internet "web site" host computer may receive therefrom data which includes a product advertisement. The potential buyer's computer then formats and presents the data, including the product advertisement, to the potential buyer who is using the computer.

For such computer-based product advertisement, systems and methods have been developed whereby a potential buyer may automatically purchase products advertised to the buyer by means of his or her computer. Typically, the computer-based product advertisement includes data comprising an embedded link which a potential buyer may activate for establishing a computer connection between the potential buyer's computer and a host computer for a producer and/or retailer selling the advertised product. When the potential buyer connects his computer to the producer/retailer's host computer (which may be shared among a number of producers, retailers, and other users), the producer/retailer may provide an electronic form which the potential buyer can fill out, using his computer, to order the desired product (s). The electronic form typically includes blank spaces for the potential buyer to enter purchase order information, including: buyer identification information (such as name, shipping address, etc.); an identification of the product(s) which is being ordered; and a credit card or account number to which the purchase price of the ordered product(s) may be billed. Once the electronic form has been correctly filled out, the buyer may communicate the purchase order information from his computer to the producer/retailer's host computer over the computer connection. Communication of the purchase order information may be initiated by various means, such as by depressing an "enter" button on the computer, a mouse-click, etc.

Exemplary systems and methods of on-line, computer-based, automatic sales transactions are described in U.S. Pat. No. 5,729,594 entitled "On-line Secured Financial Transaction System Through Electronic Media," U.S. Pat. No. 5,822,737 entitled "Financial Transaction System," and U.S. Pat. No. 5,870,473 entitled "Electronic Transfer System and Method."

Still other methods and systems of automatic sales transactions have been proposed using so-called "interactive television" wherein a buyer may interact with information received by and displayed on a television monitor. Typically, a potential buyer has a special set-top box for his or her television which receives the interactive data and presents it for display by the television monitor. The interactive data includes a product advertisement which may be displayed on the television monitor. The potential buyer also has a remote control device by which he or she may order a product advertised or displayed on the television monitor. The potential buyer's purchase order is typically communicated back to an order-entry center for the Interactive Television system by a radiowave signal, a telephony signal, or some combination thereof.

An exemplary system for interactive television-based, automatic sales transactions is described in U.S. Pat. No. 5,734,413 entitled "Transaction Based Interactive Television System."

However, systems and methods of performing an automatic sales transaction by means of an on-line computer connection, or an interactive television system, suffer some drawbacks. For example, they require the use of a computer, or specialized interactive television equipment a potential buyer may not have. Even if the potential buyer has the necessary equipment, he or she may be traveling or otherwise unable to access the equipment for periods of time.

Buyers are also often reluctant to use on-line computer-based automatic sales transactions because of security issues regarding information, especially credit information, exchanged across the Internet. Moreover, a buyer typically must conduct an on-line, computer-based automatic sales transaction with many different individual sales entities for all of the advertised products that the buyer purchases, communicating buyer and credit information to each sales entity, increasing the chance that the information may be stolen, sold, or otherwise misused.

Meanwhile, advertiser-sponsored telephony systems have been developed which allow telephony users to place telephone calls for free or at reduced rates in exchange for exposing the telephony user to promotional messages regarding advertised products. Aspects of such advertiser-sponsored telephony systems are described, for example, in commonly assigned U.S. Pat. application Ser. Nos. 09/015, 063 and 09/192,306.

Such advertiser-sponsored telephony systems have the potential for greater ubiquity than on-line computer-based advertisement systems or interactive television systems, as a user may access the advertiser-sponsored telephony system wherever he or she can find a telephone connection, including a wireless telephone connection. Moreover, potential buyers are often more comfortable sharing personal and/or credit information over a telephone connection rather than an on-line computer connection, especially if they at least initially communicate with a human on the other end of the telephone connection.

Accordingly, it would be advantageous to provide a method of performing an automatic sales transaction with an advertiser-sponsored telephony system. Other and further objects and advantages will appear hereinafter.

SUMMARY OF THE INVENTION

The present invention comprises a method of performing an automatic sales transaction in an advertiser-sponsored telephony system.

In one aspect of the invention, a telephony user to an advertiser-sponsored telephony system hears a promotional message for an advertised product in exchange for a period of free or subsidized calling using the advertiser-sponsored telephony system. The telephony user is presented with an option to automatically purchase the advertised product, for example, by striking a particular key on the telephone keypad. A purchase order is automatically generated without disconnecting the telephony user from the advertiser-sponsored telephony system.

In another aspect of the invention, an advertiser-sponsored telephony system maintains a database of essential subscriber information to enable automatic sale transactions with subscribers. Preferably, when a telephony user subscribes to the advertiser-sponsored telephony system, he or she registers a credit card, charge card, or debit card to which each automatic sales transaction purchase amount may be billed.

DESCRIPTION OF THE PREFERRED EMBODIMENTS

Figure 1:
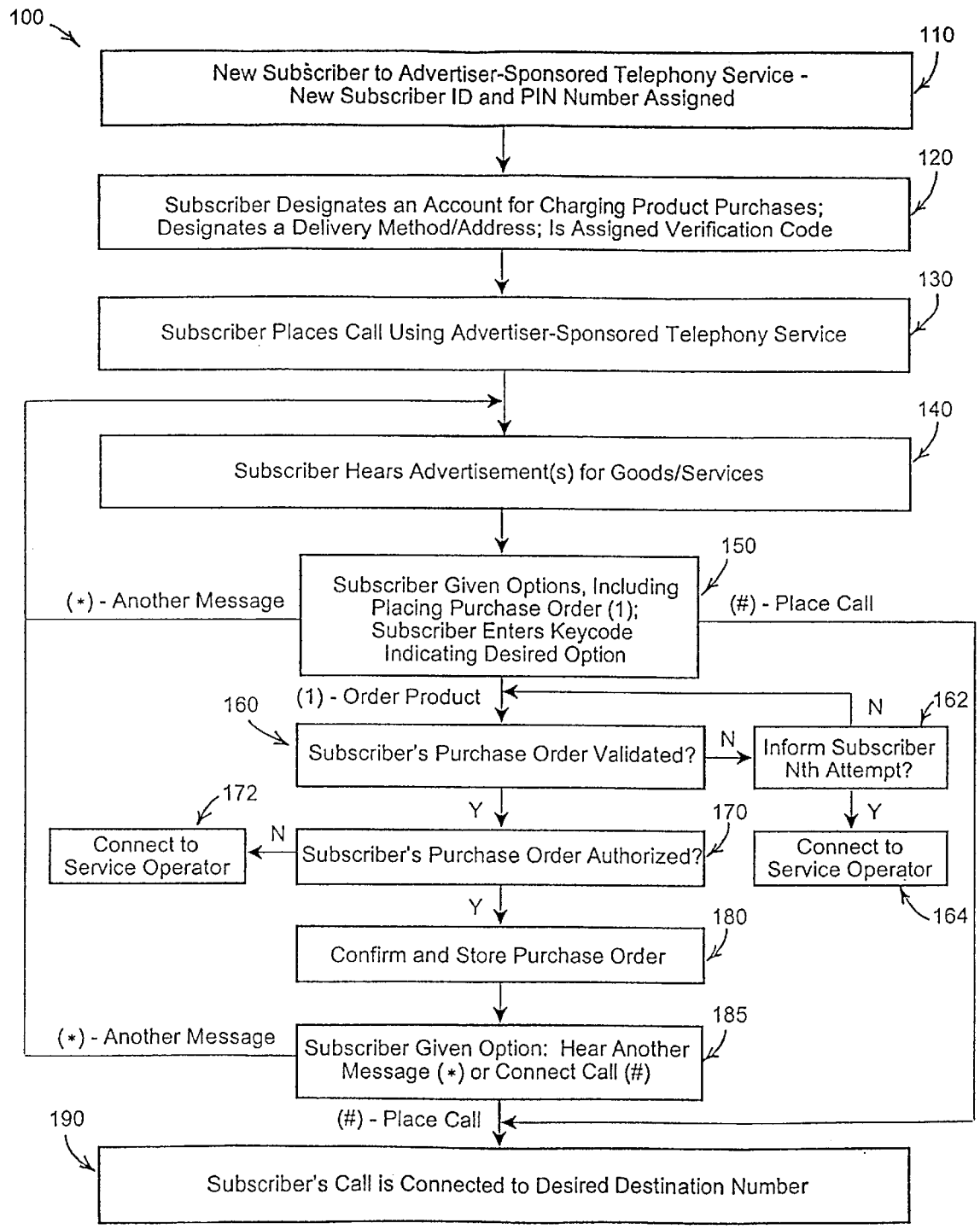
FIG. 1 is a flowchart of a call process in an advertiser-sponsored telephony system according to one or more aspects of the present invention.

Embodiments and other aspects of the invention described herein, including the system embodiments and methods described below, may be made or used in conjunction with inventions described, in whole or in part, in co-pending U.S. Pat. application Ser. No. 09/192,306, filed Nov. 16, 1998, entitled "INTERACTIVE VOICE RESPONSE AND CALL PROCESS APPLICATION FOR DELIVERING PROMOTIONAL MESSAGES VIA TELEPHONY SYSTEMS"; Provisional U.S. Application No. 60/114,572, filed Dec. 31, 1998, entitled "METHOD OF ATTENTION BROKERAGE AND BEHAVIOR MODIFICATION"; U.S. patent application Ser. No. 09/015,063, filed Jan. 28, 1998, entitled "TELEPHONY SYSTEM FOR DELIVERING PROMOTIONAL MESSAGES"; and U.S. patent application Ser. No. 09/245,409, filed Feb. 5, 1999, entitled "METHOD OF ATTENTION BROKERAGE AND BEHAVIOR MODIFICATION FOR AN ADVERTISER-SPONSORED TELEPHONY SYSTEM" each of which is commonly-assigned with the present invention and the entirety of each of which is hereby incorporated by reference for all purposes as if fully set forth herein.

FIG. 1 shows a preferred embodiment of a call process 100 in an advertiser-sponsored telephony system which provides a capability for making an automatic sales transaction. The advertiser-sponsored telephony system may be one such as that disclosed in the above-mentioned U.S. application Ser. No. 09/015,063.

In a first step 110, a telephony user subscribes to an advertiser-sponsored telephony service provided by an advertiser-sponsored telephony service provider via an advertiser-sponsored telephony system. The telephony subscriber may subscribe for service on-line via a web site, or by placing a telephone call to a service operator, or perhaps by mail. The subscribing telephony user provides subscriber information, including a subscriber name, a mailing address, etc. and is assigned a unique subscriber identification number. In a preferred embodiment, the advertiser-sponsored telephony system provides the subscribing telephony user with a personal identification number (PIN) and one or more special dialing codes or access numbers for accessing the advertiser-sponsored telephony system. In an alternative embodiment, the advertiser-sponsored telephony system may be the primary designated long-distance telecommunications carrier or provide for the telephony user. In that case, the telephony user may access the advertiser-sponsored telephony system by dialing an access number which is nothing more than a normal long distance dialing prefix (e.g., a "1") which automatically connects the telephony user with the advertiser-sponsored telephony system. Automatic number identification (ANI) would then be used to identify the calling party.

Preferably, when a telephony user subscribes to the advertiser-sponsored telephony service, in a step 120 the telephony user registers an account, such as a credit card account, charge card account, debit card account, or other such purchase vehicle which may be used to purchase an advertised product. Advantageously, the account information need only be communicated one time to the advertiser-sponsored telephony system during registration, and then it may be used for all future purchases by the telephony user. Therefore, when the telephony user wants to purchase a product advertised by the advertiser-sponsored telephony system, the advertiser-sponsored telephony system may perform an automatic sales transaction wherein there is no need for the telephony user to communicate any account or delivery information, or speak with a sales representative.

In the step 120, the telephony user also designates a delivery method for ordered products, such as a shipping address where advertised products which are to be delivered, an e-mail and/or regular mail address where a service activation notice is to be sent in the case of a purchased service, etc. Also, preferably, the telephony user provides, or is provided with, a predetermined verification code or codeword which may be used to verify the telephony user's identity when he or she attempts to perform an automatic sales transaction via the advertiser-sponsored telephony system. The advertiser-sponsor telephony system maintains a record of the predetermined verification code or codeword. The code or codeword may comprise a series of keystrokes which can be entered through a telephone keypad, or, alternatively, a voice recognition command which can verified by automated voice recognition capacities which may be incorporated in the advertiser-sponsored telephony system.

In one embodiment, the telephony user may communicate in the steps 110 and 120 with a person at the other end of a telephony connection who records the subscriber information. In an alternative embodiment, the telephone user may communicate in the steps 110 and 120 by way of a computer connection with the advertiser-sponsored telephone service, e.g., by accessing an Internet "web site" of the advertiser-sponsored telephone service.

Based on the information provided in the steps 110 and 120, the advertiser-sponsored telephony service provider maintains in a subscriber database a plurality of subscriber entries containing essential subscriber information to enable automatic sale transactions with each subscriber. In a preferred embodiment, each subscriber entry comprises a subscriber identification number, a subscriber name, an account type code (e.g., credit, charge, debit, etc.), an account number, a mailing address, and an authentication code for security purposes.

In a step 130, a telephony user establishes a telephony connection with the advertiser-sponsored telephony system to make a telephone call to a desired destination number. In one embodiment, the telephony user may dial a special access number to establish a telephony connection with the advertiser-sponsored telephony system. Preferably, the telephony user is required to enter his PIN to access the advertiser-sponsored telephony system. In an alternative embodiment, the advertiser-sponsored telephony system may be the primary designated long-distance telecommunications carrier or provider for the telephony user. In that case, the telephony user may access the advertiser-sponsored telephony system by dialing a normal long distance dialing prefix (e.g., a "1") which connects the telephony user with the advertiser-sponsored telephony system. Automatic number identification (ANI) would then be used to identify the calling party.

By using the advertiser-sponsored telephony system to establish a call with a desired destination number, the telephony user may receive a period of time, "X" minutes, for free or subsidized telephone communication, or other forms of compensation, in exchange for listening to one or more promotional messages.

In a step 140, the telephony user listens to a promotional message for an advertised product before being connected with a desired destination telephone number for an earned period of free or subsidized calling.

Upon completion of the advertisement, in a step 150 the advertiser-sponsored telephony system presents the telephony user with an option to provide an instruction to automatically place a purchase order for the advertised product. In a preferred embodiment, the advertiser-sponsored telephony system plays a prerecorded message to the telephony user informing them of a keystroke which the telephony user may enter for communicating an instruction to automatically place a purchase order for the advertised product. For example, the prerecorded message may be similar to the following:

"Please press '1' to order this product now; press '★' to hear another message; or press '#' to place your call."

In that case, the telephony user may strike a key (e.g., '1') on his or her telephone keypad to enter a keystroke comprising an instruction to automatically place a purchase order for the advertised product, or he or she may strike a different key on the telephone keypad to instruct the advertiser-sponsored telephony system to perform some other function without placing a purchase order.

In an alternative embodiment, the advertiser-sponsored telephony system may incorporate speech recognition technology. In that case, the telephony user may automatically place a purchase order for an advertised product by speaking a voice recognition prompt into the telephone microphone. Other means of providing an instruction to the advertiser-sponsored telephony system to place a purchase order may also be used.

If the telephony user chooses to hear another promotional message, then the process goes to the step 140 and continues as before. In that event, the subscriber hears another promotional message and may again have an option to purchase an advertised product. If the telephony user chooses to place a call, then in a step 190, the telephony user is connected with the desired destination number for a period of free or subsidized calling.

However, if the telephony user entered a keystroke (e.g., '1') for automatically placing a purchase order for the advertised product, then in a step 160, the advertiser-sponsored telephony system performs a validation step for the purchase order for the advertised product. In the validation step 160, the advertiser-sponsored telephony system confirms the telephony user's identity as a particular subscriber to the advertiser-sponsored telephony service, for security purposes. In a preferred embodiment, the telephony user verifies his identity as a subscriber to the advertiser-sponsored telephony service by prompting the telephony user to enter a verification code for the purchase order on his telephone keypad. The advertiser-sponsored telephony system then compares the verification code for the purchase order against a predetermined verification code which is uniquely assigned to the subscriber by the advertiser-sponsored telephony service provider. Alternatively, the advertiser-sponsored telephony system may incorporate speech recognition technology for uniquely identifying a telephony user as a subscriber, whereby the telephony user speaks a verification codeword into the telephone microphone and the advertiser-sponsored telephony system determines whether this matches a predetermined verification codeword for the subscriber. In another embodiment, the advertiser-sponsored telephony system may simply validate the purchase order using a subscriber pin code which was entered in an earlier step. In that case, the advertiser-sponsored telephony system may ask the telephony user to confirm the purchase order by entering a confirmation keystroke (e.g., "★") to confirm that he or she still wishes to place the order, or another keystroke (e.g., "#") to cancel. The confirmation may also be used to confirm quantity and/or price information associated with the order.

If the advertiser-sponsored telephony system is unable to validate the purchase order, then in a step 162 the advertiser-sponsored telephony system informs the telephony user that it could not validate the purchase order, and attempts again to validate the purchase order. After a predetermined number of attempts to validate the purchase order, (e.g., three) then in a preferred embodiment, in a step 164 the advertiser-sponsored telephony system automatically connects the telephony user with a service operator to manually validate the purchase order. Alternatively, the telephony user may be informed that the purchase order could not be validated and the call process may proceed to a step 185 or the telephony user may then be disconnected from the advertiser-sponsored telephony system.

If the advertiser-sponsored telephony system validates the purchase order, then in a step 170 the advertiser-sponsored telephony system performs an authorization process for the purchase order. In the step 170, the advertiser-sponsored telephony system verifies that the telephony user's registered account is authentic and in good standing. The price for the product(s) included in the purchase order is compared against an available balance in the telephony user's registered account and the availability of sufficient funds is confirmed. If the telephony user's registered account is a credit card account, charge card account, or debit card account, then an authorization code is received from the bank, financial institution, or company which issued the account.

If the advertiser-sponsored telephony system is unable to authorize the purchase order, then in a preferred embodiment, the advertiser-sponsored telephony system in a step 172 connects the telephony user with a service operator to attempt to manually authorize the purchase order, or explain why the purchase order was not authorized. Alternatively, the telephony user may be informed that the purchase order could not be authorized, and the call process may proceed to a step 185 or the telephony user may be disconnected from the advertiser-sponsored telephony system.

If the advertiser-sponsored telephony system authorizes the purchase order, then in the step 180 the advertiser-sponsored telephony system informs the telephony user that his purchase order has been received and will be processed, and then stores a purchase order entry, including the authorization code, in a transaction database for the advertiser-sponsored telephony system. The purchase order entry in the transaction database includes subscriber information which identifies the telephony user who placed the purchase order, and information (e.g., product ID code) identifying the product being ordered, together with the authorization code. Then the process continues in a step 185 while the advertiser-sponsored telephony system processes the telephony user's purchase order in a separate process. Thus, the advertiser-sponsored telephony system provides a capability whereby when a telephony user may easily and automatically purchase an advertised product without disconnecting from the advertiser-sponsored telephony system.

During execution of the steps 160 through 180, the advertiser-sponsored telephony system may at various points access the subscriber database to obtain essential subscriber information for completing the automatic sales transaction.

Preferably, in each of the steps 150 and 185, the telephony user is given an option of hearing another promotional message or placing a call. If the telephony user chooses to hear another promotional message, then the process goes to the step 140 and continues as before. If the telephony user chooses to place a call, then in a step 190, the telephony user is connected with the desired destination number for a period of free or subsidized calling.

While a preferred embodiment of a call process in an advertiser-sponsored telephony system which provides the capability for performing an automatic sales transaction is described above, many variations are possible which remain within the scope of the invention. In one alternative embodiment, the authorization process can be performed "off-line" while the call process proceeds by either delivering another promotional message to the telephony subscriber or by connecting the call to the desired destination number. Also, for some advertised products, the telephony user may be provided with a "quantity" option for ordering a desired quantity of the advertised product by entering a number on the telephone keypad to indicate the desired quantity.

Other such variations would become clear to one of ordinary skill in the art after inspection of the specification, drawings and claims herein. The invention therefore is not to be restricted except within the scope of the appended claims.

What is claimed is:

1. In an advertiser-sponsored telephony system which provides free or subsidized calling for telephony users in exchange for exposing the telephony users to promotional messages, a method of performing an automatic sales transaction, comprising:

establishing a telephony connection between a telephony user and said advertiser-sponsored telephony system;

exposing the telephony user to at least one promotional message advertising an advertised product;

receiving from said telephony user an instruction to automatically place a purchase order for the advertised product;

processing said purchase order for said advertised product from said telephony user; and validating said purchase order by verifying that said telephony user is a subscriber to said advertiser-sponsored telephony system.

2. The method of claim 1, wherein said instruction comprises a keystroke entered on a telephone keypad and communicated to said advertiser-sponsored telephony system.

3. The method of claim 1, wherein said instruction comprises a voice recognition command communicated from said telephony user to said advertiser-sponsored telephony system.

4. The method of claim 1, wherein validating said purchase order comprises:

storing during a registration process, prior to establishing said telephony connection, a predetermined verification code for said telephony user;

prompting said telephony user to enter a verification code for said purchase order;

communicating from said telephony user to said advertiser-sponsored telephony system said verification code for said purchase order;

comparing, at said advertiser-sponsored telephony system, said verification code for said purchase order against said predetermined verification code for said telephony user; and validating said purchase order when said verification code for said purchase order matches said predetermined verification code for said telephony user.

5. The method of claim 1, further comprising:

registering an account to be used by a telephony user to purchase the advertised product; and authorizing said purchase order by verifying that said account for said telephony user satisfies predetermined criteria.

6. The method of claim 1, further comprising:

connecting said telephony user to a desired destination number for a period of free or subsidized calling.

7. The method of claim 1, further comprising:

exposing the telephony user to another promotional message advertising another advertised product.

8. The method of claim 1, wherein establishing said telephony connection between the telephony user and said advertiser-sponsored telephony system comprises said telephony user placing a call to a special access number for said advertiser-sponsored telephony system.

9. The method of claim 8, wherein establishing said telephony connection between the telephony user and said advertiser-sponsored telephony system further comprises said telephony user entering a personal access number for accessing said advertiser-sponsored telephony system.

\* \* \* \* \*